United States Patent Office 3,644,513
Patented Feb. 22, 1972

3,644,513
POLYFLUOROISOALKOXYALKYL AMIDO CARBOXYLIC ACIDS AND SALTS THEREOF
Richard F. Sweeney, Dover, Alson K. Price, Morristown, and Aziz U. Khan, Elizabeth, N.J., assignors to Allied Chemical Corporation, New York, N.Y.
No Drawing. Filed Apr. 23, 1969, Ser. No. 818,825
Int. Cl. C07c 101/10; C07f 1/00
U.S. Cl. 260—534 E      27 Claims

ABSTRACT OF THE DISCLOSURE

Polyfluoroisoalkoxyalkyl amido carboxylic acids of the formula:

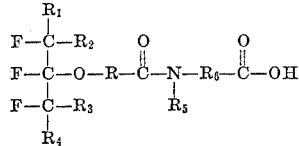

wherein $R_1$–$R_4$ are each independently selected from the group consisting of F, Cl, alkyl and haloalkyl groups in which the halogen atoms are Cl or F; $R_1$ and $R_4$ when taken together are alkylene or haloalkylene groups which form, with the carbon chain therebetween, a cyclic structure; R is a member selected from the group consisting of alkylene and haloalkylene; $R_5$ is a member selected from the group consisting of hydrogen and alkyl, and $R_6$ is a member selected from the group consisting of alkylene, monohydroxyalkylene and carboxyalkylene radicals; and salts thereof containing a cation selected from the group consisting of Li, Na, K, Rb, Cs, Ca, Ba, Mg, Zn, Hg, Al, Cr, Sn, Fe, Ag, Cu, Co, Zr, Pb, Mn, or a radical selected from morpholino, ammonium or an alkyl or hydroxyalkyl substituted ammonium radical. Preparation by reacting correspoinding polyfluoroisoalkoxyalkyl amido carboxylic acid fluorides or halosulfates with amino acids. The novel compounds are useful as emulsifying agents, leveling agents, oil, stain and water repellent agents, additives to dry powder fire extinguishing compositions and as intermediates to valuable oil, stain and water repellent agents.

CROSS-REFERENCES TO RELATED APPLICATIONS (1) Copending application of Litt et al., entitled "Fluorinated Ethers," Ser. No. 492,276, filed Oct. 1, 1965 now Patent Number 3,453,333.

(2) Copending application of Litt et al., entitled "Fluorinated Ethers," Ser. No. 513,574, filed Dec. 13, 1965 now Patent Number 3,470,256.

(3) Copending application of Anello et al., entitled "Telomers and Process for the Preparation Thereof," Ser. No. 633,359, filed Apr. 25, 1967 now Patent Number 3,514,487.

(4) Copending application of Anello et al., entitled "Polyfluoroisoalkoxyalkyl Halides," Ser. No. 818,832, filed Apr. 23, 1969, now abandoned.

(5) Copending application of Anello et al., entitled "Novel Polyhaloorgano Halosulfates," Ser. No. 818,826, filed Apr. 23, 1969.

BACKGROUND OF THE INVENTION

A variety of fluorinated carboxylic acids and derivatives thereof are known in the art to be useful surface active materials and in the production of oil, stain and water repellent agents. (See for example, U.S. Pat. 3,238,-235.) The art is continually searching for new and improved surface active materials and oil, stain and water repellent agents.

It is accordingly a major object of this invention to provide a novel class of fluorinated carboxylic acids and derivatives thereof, useful as surfactants and in the production of oil, stain and water repellent agents.

Other objects and advantages of the invention will become apparent from the following description.

SUMMARY OF THE INVENTION

We have discovered a novel class of polyfluoroisoalkoxyalkyl amido carboxylic acids and salts thereof, sometimes hereinafter referred to as the "novel amido compounds." The novel amido carboxylic acids have the general formula:

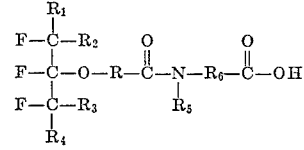  (I)

wherein $R_1$–$R_4$ are each independently selected from the group consisting of F, Cl, alkyl and haloalkyl groups in which the halogen atoms are Cl or F; $R_1$ and $R_4$ when taken together are alkylene or haloalkylene groups which, with the carbon chain therebetween, form a cyclic structure; R is a member selected from the group consisting of alkylene and haloalkylene, $R_5$ is a member selected from the group consisting of hydrogen and alkyl, and $R_6$ is a member selected from the group consisting of alkylene, monohydroxyalkylene and carboxyalkylene radicals. Novel salts in accordance with the invention which may be derived from these acids contain a cation selected from the group consisting of Li, Na, K, Rb, Cs, Ca, Ba, Mg, Zn, Hg, Al, Cr, Sn, Fe, Ag, Cu, Co, Zr, Pb, and Mn, or a radical selected from morpholino ammonium, or an alkyl or hydroxyalkyl substituted ammonium radical.

The novel amido compounds are critically characterized by the particular structure of the tail portion of the molecule and its linkage to the remainder of the molecule. The tail portion is characterized by the presence of a carbon atom linking an oxygen atom and a fluorine atom, in combination with two haloalkyl linkages satisfying the remaining valences of the carbon atom linking the oxygen and fluorine atoms. The haloalkyl linkages are characterized by the presence of at least one fluorine atom on each carbon atom which is adjacent to the carbon atom which links the oxygen and fluorine atoms.

The novel amido compounds are superior surfactants and oil, stain and water repellent agents and may be used as intermediates to prepare still other valuable surfactants and oil, stain and water repellent agents. The novel amido compounds are also useful as additives to conventional dry powder fire extinguishing agents such as potassium bicarbonate, sodium bicarbonate, ammonium sulfate, ammonium phosphate and the like. The novel amido compounds enhance the fire extinguishing capability of the powders, promote the free-flowing characteristics of the powders and serve to restrain the reflashing of fires, especially volatile hydrocarbon fires, as a result of reinstitution of flammable conditions in the area treated.

DETAILED DESCRIPTION OF THE INVENTION AND OF THE PREFERRED EMBODIMENTS

With reference to Formula I for the novel amido compounds of the invention, the $R_1$–$R_4$ groups if alkyl or haloalkyl, may be straight chain or branched chain groups, $R_1$–$R_4$ are preferably F, Cl or perhaloalkyl groups. If perhaloalkyl groups, $R_1$–$R_4$ are preferably perfluoroalkyl groups. There is no particular criticality as to the maximum number of carbon atoms in the $R_1$–$R_4$ groups. A preferred carbon content for such groups is from 1–9 carbon atoms and still preferred is from 1–2 carbon atoms. When the $R_1$–$R_4$ groups contain chlorine substitution or hydrogen substitution, it is preferred that enough fluorine substitution be provided so that the atomic ratio of fluorine to chlorine atoms, to the hydrogen atoms, or to the combined total of the chlorine and hydrogen atoms, is at least 1:1. In the most preferred embodiment $R_1$–$R_4$ are all F.

There is no particular criticality for the carbon content of the R group in Formula I. Preferably, the R group contains 1–80 carbon atoms, still preferably from 3–40 carbon atoms and most preferably from 3–22 carbon atoms. When R is fully hydrogenated, the preferred carbon content is from 6–22. When R is perhalogenated, the preferred carbon content is from 3–18. When R contains chlorine substitution or hydrogen substitution, it is preferred that enough fluorine substitution be provided so that the atomic ratio of fluorine to chlorine atoms, to hydrogen atoms, or to the combined total of the chlorine and hydrogen atoms, is at least 1:1. The R group is preferably a perhaloalkylene group and still preferably, is a perfluoroalkylene group. The R group is saturated and may be straight chain, branched chain, cyclic chain or a combination thereof. A preferred class of compounds are those having the formula:

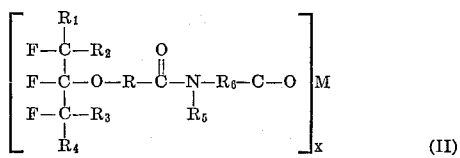

wherein $R_1$–$R_4$, R and $R_5$ are as defined in Formula I, $R_6$ is a member selected from the group consisting of alkylene and monohydroxyalkylene, M is H, a cation or ammonium or substituted ammonium radical as defined in claim 1, and $x$ is an integer equal to the charge on M.

The preferred salts are those containing a cation selected from Mg, Zn and Na, or an ammonium or hydroxyalkyl substituted ammonium radical.

The novel amido carboxylic acids may be prepared by reacting a polyfluoroisoalkoxyalkyl halosulfate or a polyfluoroisoalkoxyacyl halide with an amino acid in the presence of inert organic solvent.

The amino acids are a well known class of compounds.

Suitable polyfluoroisoalkoxyacyl halide starting materials have the formula:

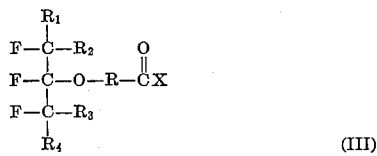

wherein $R_1$–$R_4$ are as defined in Formula I and X is F or Cl.

Suitable polyfluoroisoalkoxyalkyl halosulfate starting materials have the formula:

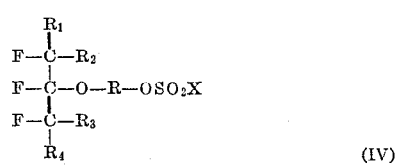

wherein $R_1$–$R_4$, R and X are as defined in Formula I with the proviso that carbon to which $OSO_2X$ is attached must contain two halogen atoms.

An illustrative reaction mechanism for the halosulfate reaction is shown as follows:

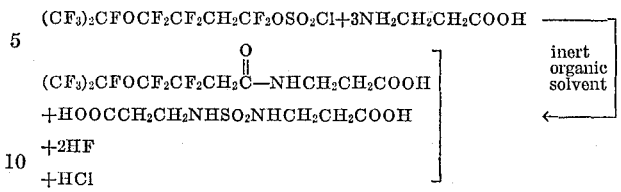

It should be noted that in the above reaction the fluorine atoms on the terminal carbon atom of the chlorosulfate starting material react to form two moles of HF. Accordingly, as indicated above, the starting halosulfate material should be perhalogenated on the terminal carbon atom. The degree of perhalogenation in the R group of the amido carboxylic acid product is determined by the choice of halosulfate starting material.

An illustrative reaction for the acid halide reaction is shown as follows:

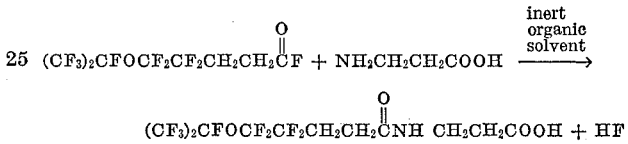

The inert organic solvent should be one in which the acid halide or halosulfate starting materials are reasonably soluble. Illustrative suitable solvents are ethyl ether and 1,1,2-trichloro-1,2,2-trifluoroethane (the latter sold by Allied Chemical Corporation under the trademark "Genesolv" D).

The halosulfate or acid halide reactions are conducted in substantially the same manner.

The molar ratio of the amino acid reactant to the acid halide or halosulfate starting material is generally between about 1:1 to 10:1 with the preferred molar ratio being about 5:1.

The preferred reaction temperature is the reflux temperature of the solvent, however, the reaction proceeds satisfactorily at lower temperatures.

Generally, approximately 2–4 hours is sufficient time for the reaction to proceed to completion. When long chain acid halides or halosulfate starting materials are employed, possessing for example above about 12 carbon atoms in the chain, longer periods may be required for the reaction to proceed to completion.

The preferred mode for combining the reactants is as follows: The amino acid reactant is suspended in the solvent and the suspension is stirred. The acid halide or halosulfate reactant is then dissolved in a separate batch of the solvent and the resulting mixture is slowly added to the suspension containing the amino acid reactant.

The amido acid product may be separated from the reaction mixture by filtering insoluble by-products and evaporating the filtrate to dryness to obtain crystals of the desired product. If desired, the product may be further purified by recrystallization from a solvent such as acetonitrile or 1,1,2-trichloro-1,2,2-trifluoroethane or by some other conventional method.

Suitable amino acid reactants are those which when reacted with the acid halide or halosulfate starting material will contribute the desired moiety defined by R in Formula I. Illustrative suitable amino acids reactants include the following:

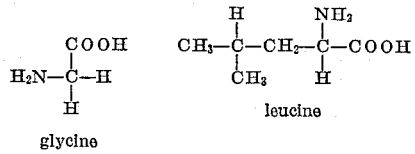

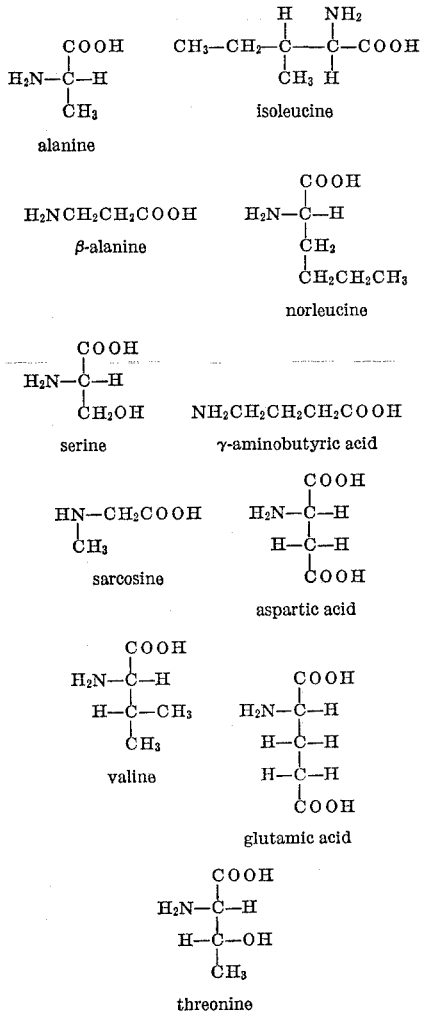

alanine isoleucine

β-alanine norleucine serine

γ-aminobutyric acid sarcosine aspartic acid valine glutamic acid threonine

The polyfluoroisoalkoxyalkyl halide starting materials of Formula III are known materials and are disclosed in Belgian Patent No. 714,160.

The polyfluoroisoalkoxyalkyl halosulfate starting materials of Formula IV may be prepared by reacting polyfluoroisoalkoxyalkyl diodides of the formula:

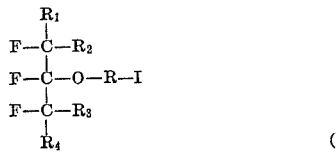

(V)

wherein $R_1$–$R_4$ and R are as defined in Formula IV with the chlorosulfonic acid or fluorosulfonic acid as appropriate. The reaction may readily be carried out by merely heating the iodide starting material with a halosulfonic acid reactant at temperatures between about 100–300° C. and preferably at temperatures between about 150–250° C.

The molar ratio of the halosulfonic acid to the iodide reactant should be at least about 1:1 and preferably from about 2:1 to about 5:1. Large excesses of the halosulfonic reactant may be employed without deleteriously affecting the reaction.

The reaction is normally complete within about 1–50 hours and more usually within a period of about 2–18 hours.

The reaction pressure is not critical. The reaction may be carried out under atmospheric pressure or under superatmospheric pressure. When the reactants are not especially volatile, the reaction is most conveniently carried out at atmospheric pressure. When the reactants are volatile, it is desirable to carry out the reaction in an autoclave so as to maintain the reactants in liquid phase.

Product recovery may be effected by simply separating the organic layer from the product mixture and subjecting the same to ordinary distillation.

The reaction techniques are conventional and are essentially the same as described in U.S. Patents 3,225,228 and 3,328,240.

The halosulfonic acid reactants are a known class of materials and are commercially available.

The polyhaloorgano alkyl iodide starting materials of Formula V are the telogen and telomer products which are disclosed in copending applications Ser. Nos. 492,276; 513,574, 633,359 and P. D. File 5300-1329 mentioned supra. Polyhaloorgano alkyl iodide starting materials of Formula V in which R contains two carbon atoms, are telogens which may be prepared by reacting an appropriate perhalogenated cyclic or acyclic ketone with an ionizable fluoride salt, e.g., KF, to form a fluorinated organic salt and then reacting the organic salt with a halogen other than fluorine (e.g. iodine or bromine) and an appropriate olefin, such as tetrafluoroethylene, in the presence of an inert organic solvent, to form the desired telogen. The reaction between the perhalogenated ketone with the ionizable fluoride salt proceeds readily at room temperature and is best carried out under anhydrous conditions in the presence of an inert organic solvent such as acetonitrile or dimethyl formamide. The reaction between the fluorinated organic salt with the olefin and a halogen also proceeds readily at room temperature and may be conducted in the same solvent medium as the first mentioned reaction. These reactions are more fully described in copending applications Ser. Nos. 492,276 and 513,574, mentioned supra.

The longer chain polyhaloorgano alkyl iodide starting materials, possessing an even number of carbon atoms linking the oxygen and iodine atoms, are telomers which may be prepared by telomerizing the telogens described above with a telomerizable unsaturated material comprising an olefin possessing only halogen and hydrogen substituents.

The telogens may first be telomerized to a desired molecular weight with a first olefin and then the resulting telomer product may optionally be further telomerized to a higher molecular weight with an additional olefin or olefins.

The telomerization reaction is carried out under free radical conditions. The free radicals are preferably produced by thermal initiation of the reaction and this is accomplished simply by heating the reactants to an elevated temperature. The elevated temperatures should normally be between about 100° C. and 350° C., preferably between about 150° C. and 200° C. Alternatively, conventional free radical generating catalysts may be employed to initiate the reaction. Although the reaction may be conducted at atmospheric pressure, superatmospheric pressures, for example, up to about 20,000 p.s.i.g. may be used with pressures between about 100 p.s.i.g. and about 10,000 p.s.i.g. being especially preferred. The chain length of the resulting product is influenced by the reaction period which may vary from about 10 minutes to about 2 weeks.

The ratio of telogen to olefin may vary from about 1:75 to as high as 200:1, the preferred ratio for batchwise operation being about 1:1 to 2:1 in the production of relatively low molecular weight telomers, i.e., telomers containing up to about 6 or 7 monomer units per telomer molecule. On the other hand, in a constant pressure reaction, i.e., where a constant pressure of olefin is maintained above the liquid phase comprising the telogen during the reaction, the molecular weight of telomer product may be controlled by varying the pressure of the olefin. In general, the higher the pressure of the olefin, the higher the molecular weight of the telomer product.

The telomerization reaction inherently produces a mixture of telomers of varying chain lengths and corresponding varying molecular weights. The average chain length and the spread of molecular weight produced by the telomerization reaction may be controlled within limits as discussed above by varying the reactant proportions, reaction time, reaction temperature, reaction pressure and other reaction variables. If desired, individual telomer products can be separated from mixtures thereof by conventional separatory techniques, for example, by fractional distillation, fractional crystallization using an inert solvent such as diethyl ether, or the mixture of telomer products may be separated into fractions of narrower ranges of molecular weights having a desired viscosity or other properties.

The telomerization reaction is described in more detail in copending application Ser. No. 633,359, mentioned supra, and in corresponding Belgian Patent 714,162.

Illustrative olefins suitable for telomerization include the following: $CF_2=CF_2$, $CF_2=CH_2$, $CF_2=CClF$, $CF_3CF=CF_2$, $CH_2=CH_2$, $CCl_2=CH_2$, $CFH=CH_2$, $CClH=CH_2$, $CFH=CF_2$, $CFH=CFH$, $CClH=CClH$, $CF_2ClCF=CH_2$, $CF_3CH=CF_2$, $CF_3CCl=CF_2$, $$(CF_3)_2C=CF_2$$

$CF_3CF=CFCl$, $CF_3CH=CFCl$, $CFCl=CFCl$, $$CF_3CF=CH_2$$

$CF_2ClCF=CF_2$, $CF_3CF=CFCF_3$, $CHF=CFCFCl_2$, $$CHF=CFCF_3$$

$CF_2=CF(CH_2)_6CH_3$, $CF_2=CFCHClCH_3$, $$CF_2=CHCH_2CH_3$$

$CF_2=CHCH_2CH_2Cl$, $CF_2=C(CF_3)CF_2(C_3H_7)$, $$CHCl=CFCF_3$$

$CH_2=CClCF_2CH_3$, $$\begin{array}{cccc} CFCl-CF & CF_2-CCl & CFCl-CF & CF-CF & CHF-CF \\ | \quad\; || & | \quad\; || & | \quad\; || & | \quad\; || & | \quad\; || \\ CF_2--CF' & CF_2-CF' & CFCl-CF' & CF_2-CF_2 & CHF-CF \end{array}$$

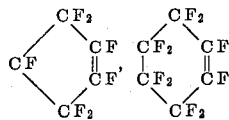

and $CH_2=C(C_2H_5)_2$. Many more suitable olefins will readily occur to one of ordinary skill in the art.

The longer chain polyhaloorgano alkyl iodide starting materials, possessing an odd number of carbon atoms linking the oxygen and iodine atoms, are telomers which may be prepared by the following procedure. A polyhaloorgano alkyl iodide telogen as defined by Formula V above, wherein R contains two carbon atoms, is reacted with sulfur trioxide to form an acid halide. This reaction is carried out at temperatures between about 50–175° C. Preferably, an excess of $SO_3$ is used and sufficient pressure is employed to maintain the reactants in liquid phase. The acid halide is hydrolyzed to the acid by refluxing in water. The resulting acid has a single carbon atom linking the oxygen atom with the carboxy group. This acid acid can then be converted to the corresponding telogen iodide atoms by the well known Hunsdiecker reaction which involves reacting the acid with alkali-free silver oxide ($Ag_2O$) to form the silver salt, followed by reaction of the silver salt with powdered iodine to form the iodide. This telogen iodide can then be telomerized with one or more olefins to produce telomer iodides having an odd number of carbon atoms linking the oxygen and iodine atoms. Illustrative procedures are shown as follows:

$$(CF_3)_2CFOCF_2CF_2I \xrightarrow{SO_3} (CF_3)_2CFOCF_2COF$$

$$(CF_3)_2CFOCF_2COF \xrightarrow{H_2O} (CF_3)_2CFOCF_2COOH$$

$$(CF_3)_2CFOCF_2COOH \xrightarrow{Ag_2O} (CF_3)_2CFOCF_2COOAg$$

$$(CF_3)_2CFOCF_2COOAg \xrightarrow{I_2} (CF_3)_2CFOCF_2I$$

$$(CF_3)_2CFOCF_2I \xrightarrow{CF_2=CF_2} (CF_3)_2CFOCF_2(CF_2CF_2)_mI$$

$$(CF_3)_2CFOCF_2(CF_2CF_2)_mI \xrightarrow{CF_2=CH_2} \begin{array}{l} \rightarrow (CF_3)_2CFOCF_2(CF_2CF_2)_m(CH_2CF_2)_nI \\ \qquad\qquad (A) \\ \rightarrow (CF_3)_2CFOCF_2(CF_2CF_2)_m(CF_2CH_2)_nI \\ \qquad\qquad (B) \end{array}$$

It should be noted that the above-noted telomerization reaction produces two products (A) and (B). The (A) product is obtained in about a 95% yield. The (B) product is obtained in about a 5% yield. The (A) and (B) products can be separated by conventional procedures. For example, dehydroiodinating the (A) and (B) product mixture with KOH at 75–150° C. preferentially converts product (A) to the corresponding olefin which can then be readily separated from product (B) by distillation.

The various metal, morpholino, ammonium and substituted ammonium salts of the invention may be prepared from the corresponding free acids by conventional techniques well known in the art.

The ammonium salts may be readily prepared by dissolving the free acid in a suitable organic solvent, such as ethyl ether, and bubbling anhydrous ammonia into the solvent solution at room temperature over a period of about 2–6 hours. The solvent may then be evaporated off leaving the desired product as a residue.

The morpholino salts and the substituted ammonium salts may be prepared by reacting the free acid with a suitable amine, in the presence of an organic solvent, such as ethyl ether, at temperatures in the range of about 25–40° C. The amine reactant may be morpholine or a primary, secondary or tertiary alkyl or alkanolamine. Illustrative suitable amine reactants include the following: methylamine, ethylamine, isopropylamine, sec-butylamine, dodecylamine, trimethylamine, dimethylamine, triethylamine, methyldiethylamine, dimethylisopropylamine, ethanolamine, triethanolamine, 2-aminobutanol-1 and 2-aminooctanol-1. The preferred carbon content of the amine is 1–6 carbon atoms, and still preferably 1–3 carbon atoms.

The metal salts may be prepared by fusion in which the free acid is heated with powdered metal, metal oxide or metal hydroxide. If desired a non-halogenated solvent such as isopropanol may be employed. The metal reactant, which may be in the form of a dry powder, a slurry, or a solution should be added to the acid. Any water present in the mixture is driven off as steam or it may be removed under reduced pressure. The molar ratio of acid to the metal, metal oxide, or metal hydroxide reactant depends on the valence state of the metal. Reaction temperatures are generally between 70–150° C. The reactions are usually complete in 15 minutes to 1 hour. The product may be purified by recrystallization from an organic solvent such as pyridine.

The salts may also be prepared from the free acids by conventional precipitation techniques in which a metallic-salt reactant is dissolved in water and then reacted with the free acid, optionally in the presence of an organic solvent, or by conventional double decomposition reactions in which a water soluble salt of the amido acid is reacted with a water soluble salt of the metal in aqueous medium.

When $R_6$ comprises a carboxyalkylene group, the salts of the invention can comprise single or double salts derived from the two carboxyl functions present in the molecule. The reaction of 1 mole or equivalent of the salt forming agent with 1 mole of an acid containing two carboxyl functions will result in a mixture of two possible single salts in which one of the carboxyl groups is reacted and in which the other is unreacted. The individual salt species may be separated from the salt mixture by conventional methods. Reaction of at least two moles or equivalents of the salt forming agent with one mole of dicarboxylic acid will result in double salts as described above.

The novel amido compounds are surface active and may be used in the preparation of emulsion and surface coatings. They may be used as leveling agents for aqueous wax and/or resin emulsions known as self-polishing wax formulations and as surfactants in the emulsion polymerization of ethylenically unsaturated compounds in the manner described in United States Patent 3,238,235.

The novel amido compounds when applied to textiles impart oil, stain and water repellency thereto. The acids may also be used as intermediates to prepare Werner type chrome complexes which are useful as stain, water and oil repellency agents.

The novel amido compounds are particularly useful as additives to dry powder fire extinguishing compositions. When such compounds are mixed with conventional dry powder fire extinguishing compounds, the novel amido compounds effect one or more of the following results: (a) enhances the fire extinguishing capabilities of the powder, (b) promotes the free flowability of the powder, (c) increases the compatibility of the powder with other fire extinguishing agents, and (d) serves as an anti-flashing agent to prevent reignition in the event flammable conditions become reestablished in the treated area.

Illustrative conventional dry powder fire extinguishing compounds include the following: sodium bicarbonate, potassium bicarbonate, magnesium bicarbonate, ammonium sulfate, ammonium phosphate, calcium carbonate and mineral barytes. A variety of other additives may be

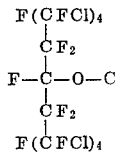

incorporated with these dry powder fire extinguishing compounds.

For best results, the novel amido compounds should be intimately mixed with the dry powder fire extinguishing components. This may be accomplished, for example, by grinding the dry fire extinguishing component or components and the amido compound together in a ball mill. Alternatively and preferably, these materials may be intimately mixed by a procedure which comprises dissolving the amido compound in an inert organic solvent, such as acetone or acetonitrile, slurrying the dry powder into the solvent, evaporating the solvent from the solution and then drying the product, for example, at 100° C. Additional grinding in a suitable mill may be desirable to optimize the free flowing characteristics of the powder. Whatever mixing means is employed, the amido compound forms a continuous or discontinuous layer or coating on the powder surfaces. It is theorized that this fluoro-chemical layer is desorbed from the dry powder during the fire fighting and forms a film on the surface of the volatile fuel. This serves to suppress the vaporization of the fuel, thereby tending to prevent reflashing of the fire if flammable conditions become reestablished.

The amount of amido compound is not critical and will vary depending on the particular compound chosen and the composition with which it is formulated. The optimum amount can be determined by routine experimentation. Generally, the amido compound should be used in at least about .1% by weight of the composition. For practical reasons, nothing is to be gained by using a composition of greater than 5% by weight of the amido compound.

The dry powder formulations containing the novel amido compounds may be applied in the conventional manner from containers pressurized with compressed air or carbon dioxide.

Illustrative compounds within the scope of the invention include the following:

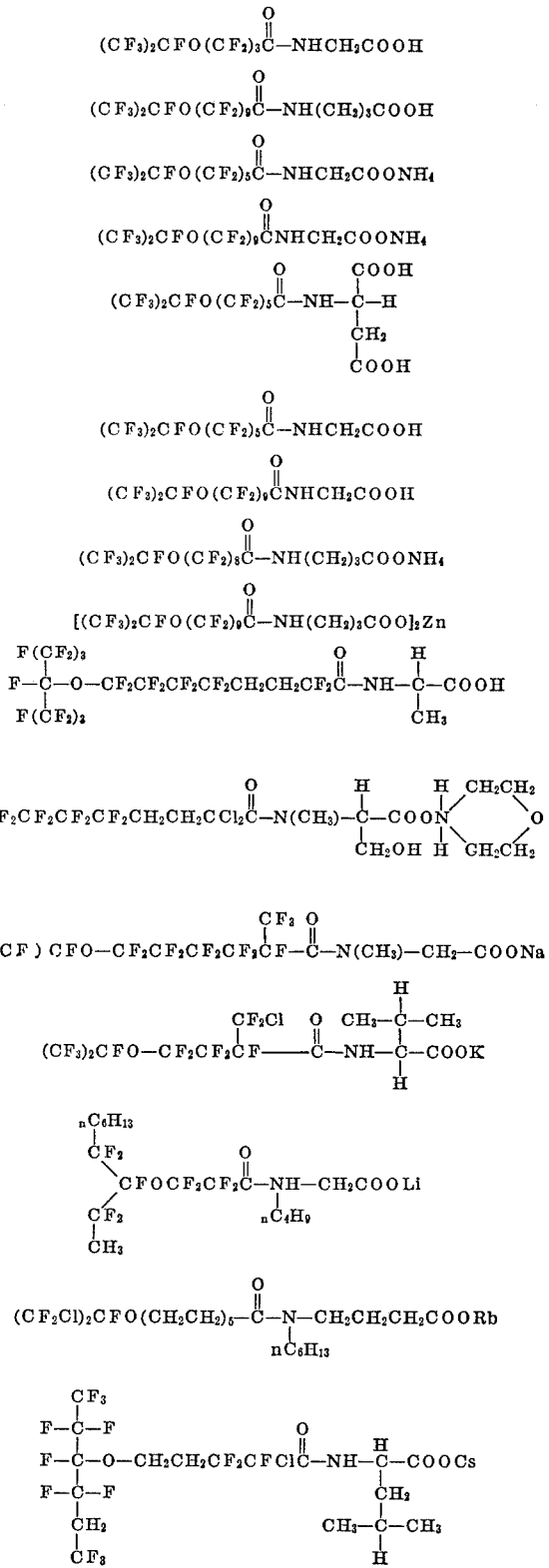

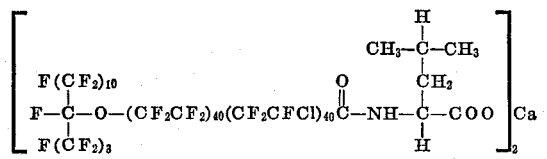

$(CF_3)_2CFO-(CF_2CF_2)_hCH_2CF_2\overset{O}{\overset{\|}{C}}-NHCH_2CH_2CO\overset{H}{\overset{|}{O}}NH_2CH_2OH$
(h=1—10)

$CF_3)_2CFO-(CF_2CFCl)_hCH_2CH_2CCl_2\overset{O}{\overset{\|}{C}}-NHCH_2CH_2CH_2CO\overset{H}{\overset{|}{O}}N(C_2H_5OH)_3$
(h=1—10)

$(CF_3)_2CFO-(CF_2CF[CF_3])_hCH_2CF_2\overset{O}{\overset{\|}{C}}-NHCH_2CO\overset{C_2H_5}{\underset{CH_3}{\overset{|}{O}NH(CH_2)_3OH}}$
(h=1—10)

The following examples provide a further description of the invention, it being understood that these examples are being given for purposes of illustration only and are not to be regarded as restricting the invention which is defined by a reasonable interpretation of the appended claims. Parts are by weight except as otherwise indicated.

Example 1.—N-[perfluoro-(5-oxa-6-methylheptanoyl)] amidoacetic acid

To a stirred suspension of 7.50 g. (0.10 mole) glycine (NH$_2$CH$_2$COOH) in about 30 ml. of ethyl ether were added 7.64 g. (0.02 mole) of perfluoro-(5-oxa-6-methylheptanoyl)-fluoride in 70 ml. of ethyl ether, over a 15 minute period. The mixture was heated under reflux conditions for 4 hours in a nitrogen atmosphere. After this period the reaction mixture was allowed to cool and was then filtered to remove any insoluble material. The residue on the filter paper was extracted with three 30 ml. portions of ethyl ether; the ether extracts were combined with the filtrate, washed with 150 ml. of water, dried over molecular sieves and finally evaporated. The crude produce, a hazy oil, was taken up in hot benzene. Upon cooling, the oily produce separated and residual benzene was removed in vacuo. There were obtained 5.20 g. (59.5% yield) of a compound identified as $$\underset{CF_3}{\overset{CF_3}{>}}CFO(CF_2)_3\overset{O}{\overset{\|}{C}}-NHCH_2COOH$$

Analysis.—Calcd for C$_9$H$_4$F$_{13}$NO$_4$ (percent): C, 24.60; H, 0.91; F, 56.40; N, 3.20. Found (percent): C, 24.85; H, 1.02; F, 54.54; N, 2.97.

Infrared spectrographic analysis confirmed this structure.

Example 2.—N-[perfluoro-(7-oxa-8-methylnonanoyl)] amidoacetic acid

Following the general procedure described in Example 1, 96.4 g. (0.20 mole) perfluoro-(7-oxa-8-methylnonanoyl)-fluoride were added to a stirred suspension of 57.64 g. (0.77 mole) glycine in 700 ml. ethyl ether over a period of 40 minutes. The mixture was refluxed for 4 hours in the nitrogen atmosphere and then stirred overnight at room temperature. The resulting reaction mixture was filtered and the solvent evaporated. The crude product was recrystallized from benzene to provide 86.20 g. (80% yield) of a white solid identified as:

$$\underset{CF_3}{\overset{CF_3}{>}}CFO(CF_2)_5\overset{O}{\overset{\|}{C}}-NHCH_2COOH$$

Analysis.—Calcd for C$_{11}$H$_4$F$_{17}$NO$_4$ (percent): C, 24.60; H, 0.74; F, 60.00; N, 2.61. Found (percent): C, 23.54; H, 0.79; F, 57.11; N, 2.63.

Infrared spectrographic analysis confirmed this structure.

Example 3.—N-[perfluoro-(11-oxa-12-methyltridecanoyl)]-4-amidobutyric acid

The general procedure of Example 1 was followed except that a chlorosulfate starting material was substituted for the acyl fluoride starting material. Thus, 160.0 g. (0.20 mole perfluoro (11-oxa-12-methyltridecylchlorosulfate in 400 ml. of ethyl ether were added to a stirred suspension of 103.0 g. (1 mole) of 4-aminobutyric acid in 650 ml. of ethyl ether over a period of 40 minutes. The resulting mixture was refluxed for 4 hours. After isolation and recrystallization from acetonitrile, 92.8 g. (60.3% yield) of product, M.P. 86–87° C., were obtained. This product was identified as

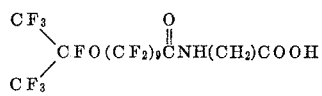

Infrared spectrographic analysis confirmed this structure.

Example 4.—N-[perfluoro-(11-oxa-12-methyltridecanoyl)]amidoacetic acid

Following the procedure of Example 3, 160.0 g. (0.20 mole) perfluoro-(11-oxa-12-methyltridecyl)chlorosulfate in 300 ml. ethyl ether were added over a period of 40 minutes to a stirred suspension of 75.0 g. (1 mole) glycine in 650 ml. of ethyl ether. The mixture was refluxed for 4 days. Upon isolation and recrystallization from acetonitrile, 56.0 g. (38.0% yield) of the desired product, M.P. 73–75° C., were obtained. The produce was identified as

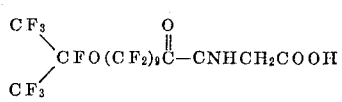

Infrared spectrographic analysis confirmed the expected structure.

Example 5.—Ammonium N-[perfluoro-(7-oxa-8-methylnonanoyl)]amidoacetate

Anhydrous ammonia gas was bubbled into a solution of 16.08 g. (0.03 mole) of N-[perfluoro-(7-oxa-8-methylnonanoyl)]amidoacetic acid in 400 ml. of ethyl ether over a period of 2.5 hours at room temperature. The ether was removed by evaporation in vacuo to yield the ammonium salt. A total of 14.70 g. (88.1% yield) of a soft, water soluble solid, M.P. 148–152° C., was obtained and identified as:

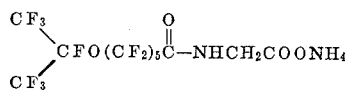

Example 6.—Ammonium N-[perfluoro-(11-oxa-12-methyltridecanoyl)]amidobutyrate

Anhydrous ammonia gas was bubbled into a solution of 15.30 g. (0.02 mole) of N - [perfluoro - (11-oxa-12-methyltridecanoyl)]amidobutyric acid in 400 ml. of ethyl ether over a period of 2.5 hours at room temperature. After evaporation of the solvent, 14.76 g. (94.0% yield) of a product was obtained and identified as:

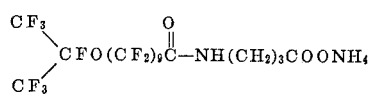

Example 7.—Ammonium N-[perfluoro-(11-oxa-12-methyltridecanoyl)]amidoacetate

Anhydrous ammonia gas was bubbled into a solution of 7.37 g. (0.01 mole) of N-[perfluoro-(11-oxa-12-methyltridecanoyl)]amidoacetic acid in 350 ml. of ethyl ether for a period of 5 hours at room temperature. There were obtained 4.88 g. (65% yield) of a soft, white, water-soluble solid, M.P. 128–130° C., identified as

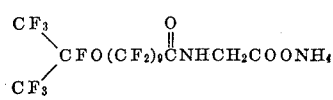

Example 8.—Zinc N-[perfluoro-(11-oxa-12-methyltridecaonyl)]-4-amidobutyrate 1.90 g. (0.0025 mole) of N - [perfluoro-(11-oxa-12-methyltridecanoyl)]amidobutyric acid were heated to melting (M.P. 86–87° C.). 0.102 g. (0.00125 mole) powdered zinc oxide were slowly added to the melt with vigorous stirring. The temperature of the resulting mixture was maintained at 120–130° C. for 30 minutes. After the end of this period the mixture was cooled and dissolved in hot pyridine. The insoluble material was filtered off and the filtrate was cooled to 0° C. to recover the recrystallized product. A total of 1.20 g. (57.8% yield) of an off-white, crystalline solid, M.P. 145–148° C., was obtained. This product was identified as:

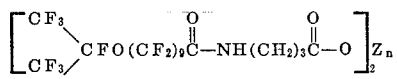

*Analysis.*—Calcd. for $C_{34}H_{14}F_{50}N_2O_8Zn$ (percent): C, 25.60; H, 0.88; F, 59.75; N, 1.86; Zn, 4.10. Found (percent): C, 27.10; H, 0.90; F, 58.04; O, 2.16; Zn, 3.53.

Infrared spectrographic analysis confirmed this structure.

Salts of Sn, Cu, Zr and Hg are most conveniently prepared by double decomposition reactions in which a water, soluble salt of an amido acid is reacted with a water soluble salt of metal in aqueous medium. Thus, when the sodium salt of N-[perfluoro-(11 - oxa - 12 - methyltridecanoyl)]amidobutyric acid is reacted with $SnCl_4$, $CuCl_2$, $ZrCl_4$ and $HgCl_2$, respectively, in aqueous medium, crystalline solids comprising the respective salts of the amido acids are formed.

We claim:
1. Compounds of the formula

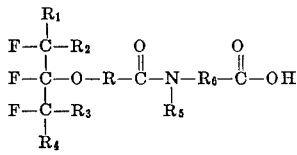

wherein:

(a) $R_1$–$R_4$ are each independently selected from the group consisting of F, Cl, alkyl and haloalkyl groups in which the halogen atoms are Cl or F, $R_1$ and $R_4$ when taken together are alkylene or haloalkylene groups which, with the carbon chain therebetween, form a cyclic structure, (b) R is a member selected from the group consisting of alkylene and haloalkylene, (c) $R_5$ is a member selected from the group consisting of hydrogen and alkyl, and (d) $R_6$ is a member selected from the group consisting of alkylene, monohydroxyalkylene and carboxyalklene radicals;

and salts thereof containing a cation selected from the group consisting of Li, Na, K, Rb, Cs, Ca, Ba, Mg, ammonium radical.

2. Compounds according to claim 1 having the formula:

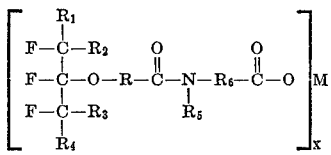

wherein $R_1$–$R_4$, R and $R_5$ are as defined in claim 1, $R_6$ is a member selected from the group consisting of alkylene and monohydroxyalkylene, M is H, ammonium or a cation as defined in claim 1, and $x$ is an integer equal to the charge on M.

3. Compounds according to claim 2 wherein the $R_1$–$R_4$ groups are each independently selected from the group consisting of F, Cl, and perhaloalkyl groups.

4. Compounds according to claim 3 in which the R group contains from 3 to 40 carbon atoms.

5. Compounds according to claim 4 in which the R group contains from 3 to 22 carbon atoms.

6. Compounds according to claim 5 in which $R_1$–$R_4$ are each F atoms.

7. Compounds according to claim 6 in which R is alkylene.

8. Compounds according to claim 6 in which R is haloalkylene.

9. Compounds according to claim 6 in which R is perfluoroalkylene.

10. Compounds according to claim 6 in which R is straight chain perfluoroalkylene.

11. Compounds according to claim 6 in which $R_5$ is H.

12. Compounds according to claim 6 in which $R_5$ is alkyl.

13. Compounds according to claim 6 in which $R_6$ is alkylene.

14. Compounds according to claim 6 in which $R_6$ is monohydroxyalkylene.

15. Compounds according to claim 1 in which $R_6$ is carboxyalkylene.

16. Compounds according to claim 6 in which M is H.

17. Compounds according to claim 6 in which M is Li, K, or Na.

18. Compounds according to claim 6 in which M is ammonium.

19. Compounds according to claim 6 in which M is Mg.

20. A compound according to claim 6 which is

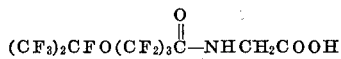

21. A compound according to claim 6 which is

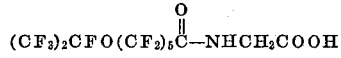

22. A compound according to claim 6 which is

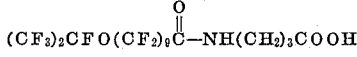

23. A compound according to claim 6 which is

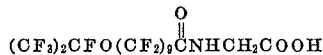

24. A compound according to claim 6 which is

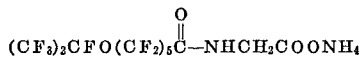

25. A compound according to claim 6 which is

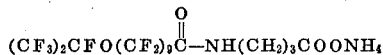

26. A compound according to claim 6 which is

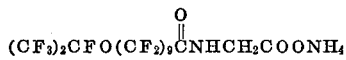

27. A compound according to claim 1 which is

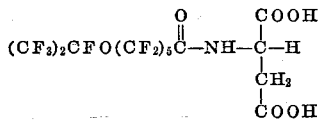

References Cited
UNITED STATES PATENTS

| | | | |
|---|---|---|---|
| 2,191,738 | 2/1940 | Balle | 260—534 |
| 2,713,593 | 7/1955 | Brice et al. | 260—535 H |
| 3,238,235 | 3/1966 | Hauptschein | 260—404 |
| 3,274,239 | 9/1966 | Selman | 260—535 H |
| 3,250,808 | 5/1966 | Moore et al. | 260—535 H |
| 2,567,011 | 9/1951 | Diesslin et al. | 260—465.7 |

LORRAINE A. WEINBERGER, Primary Examiner

J. L. DAVISON, Assistant Examiner

U.S. Cl. X.R.

8—115.6, 116.2; 106—10; 117—239.5 CQ; 252—7; 260—31.8 K, 32.2, 247.2 A, 429 R, 429.3, 429.7, 430, 431, 435 R, 438.1, 438.5 R, 439 R, 448 501.11, 514 R, 534 M, 534 C, 534 G

PO-1050
(5/69)

UNITED STATES PATENT OFFICE
CERTIFICATE OF CORRECTION

Patent No. 3,644,513      Dated February 22, 1972

Inventor(s) Richard F. Sweeney, Alson K. Price & Aziz U. Khan

It is certified that error appears in the above-identified patent and that said Letters Patent are hereby corrected as shown below:

Col. 5, line 48, "diodides" should read -- iodides --;

Col. 6, line 7, "Patents 3,225,228" should read
-- Patents 3,255,228 --;

Col. 6, line 8, "and 3,328,240" should read
-- and 3,238,240 --;

Col. 7, line 25, "$(CF_3)_2C=CF_2$" should read -- $(CF_3)_2C=CF_2$, --;

Col. 7, line 36, "$CF_2=CHCH_2CH_3$" should read -- $CF_2=CHCH_2CH_3$, --;

Col. 7, 2nd. to last formula,

"$\begin{array}{c}CFCl-CF\\|\phantom{XX}\|\\CF_2\phantom{X}CF\end{array}$ $\begin{array}{c}CF_2-CCl\\|\phantom{XX}\|\\CF_2-CF\end{array}$, $\begin{array}{c}CFCl-CF\\|\phantom{XX}\|\\CFCl-CF\end{array}$, $\begin{array}{c}CF-CF\\\|\phantom{X}\|\\CF_2-CF_2\end{array}$, $\begin{array}{c}CHF-CF\\\diagdown\phantom{X}\diagup\!\!\!\diagup\\CHF-CF\end{array}$" should read -- $\begin{array}{c}CFCl-CF\\|\phantom{XX}\|\\CF_2\phantom{X}-CF\end{array}$, $\begin{array}{c}CF_2-CCl\\|\phantom{XX}\|\\CF_2-CF\end{array}$, $\begin{array}{c}CFCl-CF\\|\phantom{XX}\|\\CFCl-CF\end{array}$, $\begin{array}{c}CF-CF\\|\phantom{X}\|\\CF_2-CF_2\end{array}$, $\begin{array}{c}CHF-CF\\|\phantom{X}\|\\CHF-CF\end{array}$, --;

Col. 7, last formula,

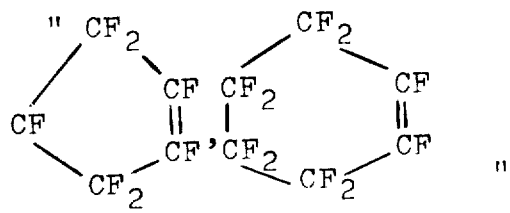

"

should read

Page 2

UNITED STATES PATENT OFFICE
CERTIFICATE OF CORRECTION

Patent No. 3,644,513   Dated February 22, 1972

Inventor(s) Richard F. Sweeney, Alson K. Price & Aziz U. Khan

It is certified that error appears in the above-identified patent and that said Letters Patent are hereby corrected as shown below:

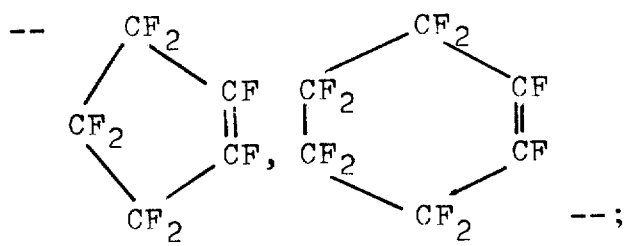

Col. 10, line 50, "(CF)CFO-" should read -- $(CF_3)_2CFO-$ --;

Col. 11, 5th. formula

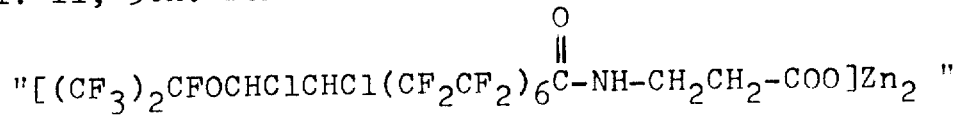

should read

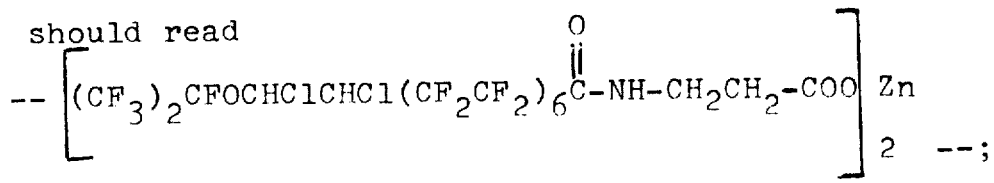

Col. 11, 6th. formula

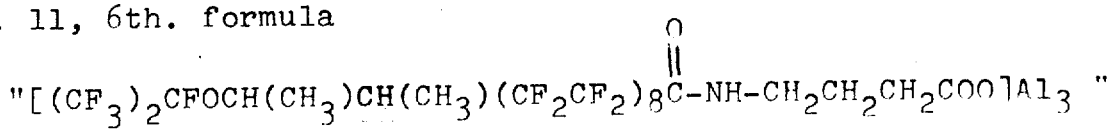

should read

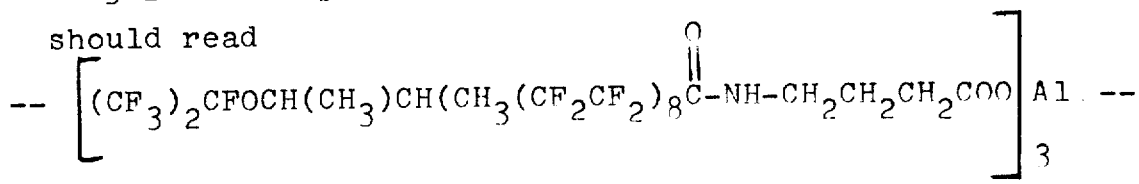

UNITED STATES PATENT OFFICE
CERTIFICATE OF CORRECTION

Patent No. 3,644,513      Dated February 22, 1972

Inventor(s) Richard F. Sweeney, Alson K. Price & Aziz U. Khan

It is certified that error appears in the above-identified patent and that said Letters Patent are hereby corrected as shown below:

Col. 11, 7th formula

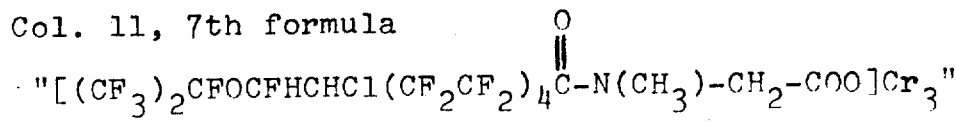

should read

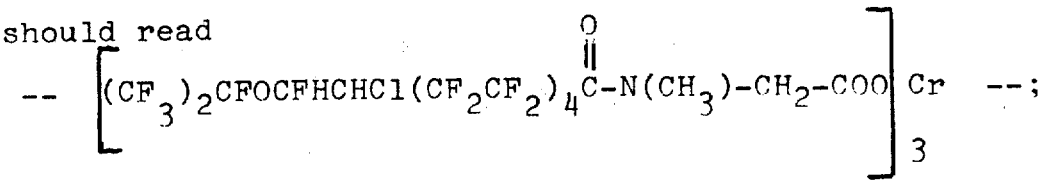

Col. 11, 8th formula

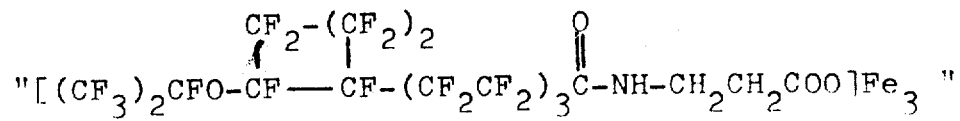

should read

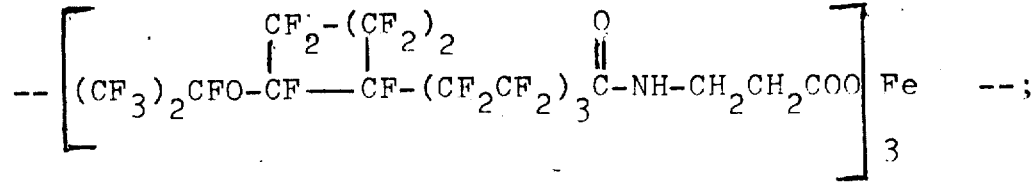

Col. 11, 9th formula

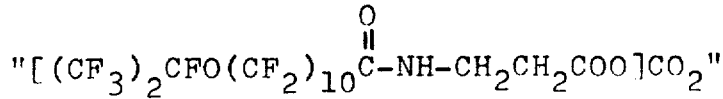

should read

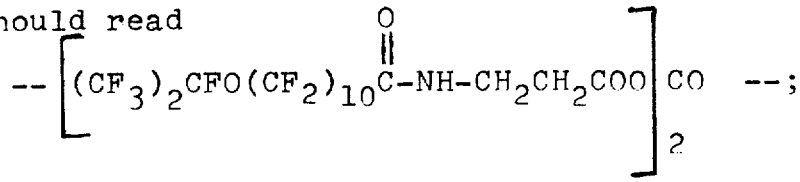

UNITED STATES PATENT OFFICE
CERTIFICATE OF CORRECTION

Patent No. 3,644,513  Dated February 22, 1972

Inventor(s) Richard F. Sweeney, Alson K. Price & Aziz U. Khan

It is certified that error appears in the above-identified patent and that said Letters Patent are hereby corrected as shown below:

Column 11, 12th. formula

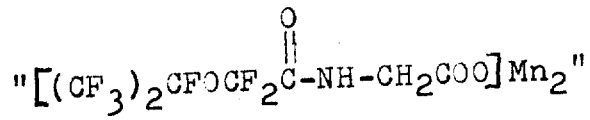

should read

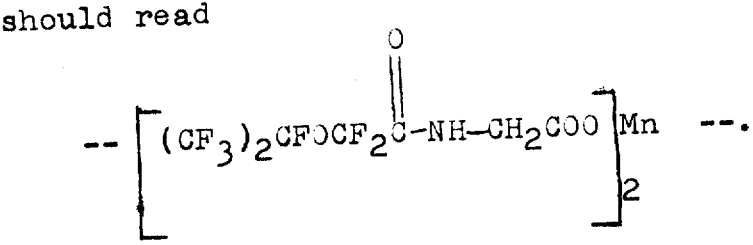

UNITED STATES PATENT OFFICE
CERTIFICATE OF CORRECTION

Patent No. 3,644,513　　　　Dated February 22, 1972

Inventor(s) Richard F. Sweeney, Alson K. Price & Aziz U. Khan

It is certified that error appears in the above-identified patent and that said Letters Patent are hereby corrected as shown below:

Col. 13, 1st. formula

"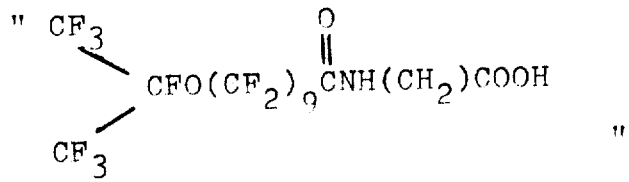"

should read

--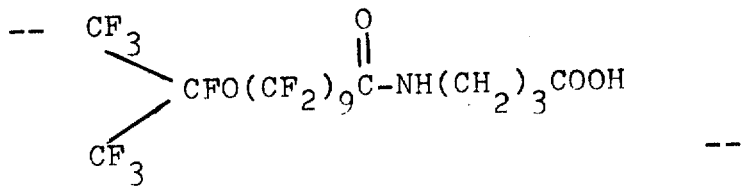--

Col. 14, line 21, "O, 2.16;" should read

-- N, 2.16; --

Col. 14, line 27, "salt of metal" should read

-- salt of the metal --

Col. 14, line 57, "Mg, am-" should read

-- Mg, or an am- --

Signed and sealed this 15th day of May 1973.

(SEAL)
Attest:

EDWARD M. FLETCHER, JR.　　　　ROBERT GOTTSCHALK
Attesting Officer　　　　　　　　Commissioner of Patents